United States Patent
Ng et al.

(10) Patent No.: US 10,532,579 B2
(45) Date of Patent: Jan. 14, 2020

(54) PRINTHEAD-INTEGRATED INK LEVEL SENSOR WITH CENTRAL CLEARING RESISTOR

(71) Applicant: Hewlett-Packard Development Company, L.P., Houston, TX (US)

(72) Inventors: Boon Bing Ng, Vancouver, WA (US); Patrick Leonard, Leixlip (IE); Raymond Connolly, Leixlip (IE)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 0 days.

(21) Appl. No.: 15/761,621

(22) PCT Filed: Nov. 10, 2015

(86) PCT No.: PCT/US2015/060006
§ 371 (c)(1),
(2) Date: Mar. 20, 2018

(87) PCT Pub. No.: WO2017/082886
PCT Pub. Date: May 18, 2017

(65) Prior Publication Data
US 2018/0354271 A1  Dec. 13, 2018

(51) Int. Cl.
*B41J 2/175* (2006.01)
*G01F 23/26* (2006.01)
*B41J 2/14* (2006.01)

(52) U.S. Cl.
CPC ......... *B41J 2/17566* (2013.01); *B41J 2/1753* (2013.01); *B41J 2/17596* (2013.01);
(Continued)

(58) Field of Classification Search
CPC ........ B41J 2002/14354; B41J 2/14153; G01F 23/26; G01F 23/263
See application file for complete search history.

(56) References Cited

U.S. PATENT DOCUMENTS 4,853,718 A  8/1989  ElHatem et al.
5,682,184 A * 10/1997  Stephany ............. B41J 2/17566
                                                            347/7

(Continued)

FOREIGN PATENT DOCUMENTS

CN  1203358  12/1998
CN  1309293   8/2001
(Continued)

*Primary Examiner* — John Zimmermann
(74) *Attorney, Agent, or Firm* — HP Inc. Patent Department

(57) ABSTRACT

The present subject matter relates to printhead-integrated ink level sensor (PILS) system. In an example implementation, the PILS system includes a sense capacitor plate in a fluid sensing chamber to sense a level of fluid in the fluid sensing chamber. The fluid sensing chamber is in fluid communication with a fluid reservoir of the printhead to receive fluid from the fluid reservoir. The sense capacitor plate includes at least one slot. The PILS system further includes at least one central clearing resistor and at least one peripheral clearing resistor to clear the fluid sensing chamber of the fluid. The central clearing resistor is provided in the at least one slot of the sense capacitor plate. The at least one peripheral resistor is provided in the fluid sensing chamber surrounding the sense capacitor plate.

15 Claims, 4 Drawing Sheets

(52) U.S. Cl.
CPC ... *G01F 23/263* (2013.01); *B41J 2002/14354* (2013.01); *B41J 2002/17579* (2013.01); *B41J 2202/13* (2013.01)

(56) References Cited

U.S. PATENT DOCUMENTS

| | | | |
|---|---|---|---|
| 5,721,574 A | 2/1998 | Kubby | |
| 6,264,302 B1 * | 7/2001 | Imanaka | B41J 2/0451 347/19 |
| 6,398,329 B1 | 6/2002 | Boyd et al. | |
| 9,085,139 B2 | 7/2015 | Benjamin | |
| 2007/0153032 A1 | 7/2007 | Chou et al. | |
| 2010/0033539 A1 | 2/2010 | Silverbrook et al. | |
| 2010/0295884 A1 | 11/2010 | Smektala | |
| 2012/0056943 A1 * | 3/2012 | Nielsen | B41J 2/14 347/63 |
| 2014/0002538 A1 * | 1/2014 | Benjamin | B41J 2/0451 347/19 |
| 2014/0204148 A1 | 7/2014 | Ge et al. | |
| 2015/0273848 A1 | 10/2015 | Ge et al. | |
| 2017/0021626 A1 | 1/2017 | Ge et al. | |
| 2017/0036452 A1 * | 2/2017 | Ge | B41J 2/04541 |
| 2017/0173969 A1 * | 6/2017 | Ge | B41J 2/04541 |

FOREIGN PATENT DOCUMENTS

| | | |
|---|---|---|
| CN | 101668638 | 3/2010 |
| CN | 102442074 | 5/2012 |
| TW | 201425056 A | 7/2014 |
| WO | WO 2014/084843 A1 * | 6/2014 |

* cited by examiner

PRINTHEAD-INTEGRATED INK LEVEL SENSOR WITH CENTRAL CLEARING RESISTOR

BACKGROUND

Inkjet printers use at least one fluid ejection device on a printhead to eject drops of ink through a plurality of orifices or nozzles toward print media so as to print onto the print media. The print media may include any type of suitable sheet or roll material, such as paper, card stock, transparencies, polyester, plywood, foam board, fabric, canvas, and the like. The nozzles are generally arranged in one or more columns or arrays such that a properly sequenced ejection of ink from nozzles causes characters, symbols, and/or other graphics or images to be printed on the print media as the printhead and the print media are moved relative to each other. Some printheads include integrated ink level sensors to sense a level of the ink in the printhead.

BRIEF DESCRIPTION OF DRAWINGS

The following detailed description references the drawings, wherein.

DETAILED DESCRIPTION

Figure 1:
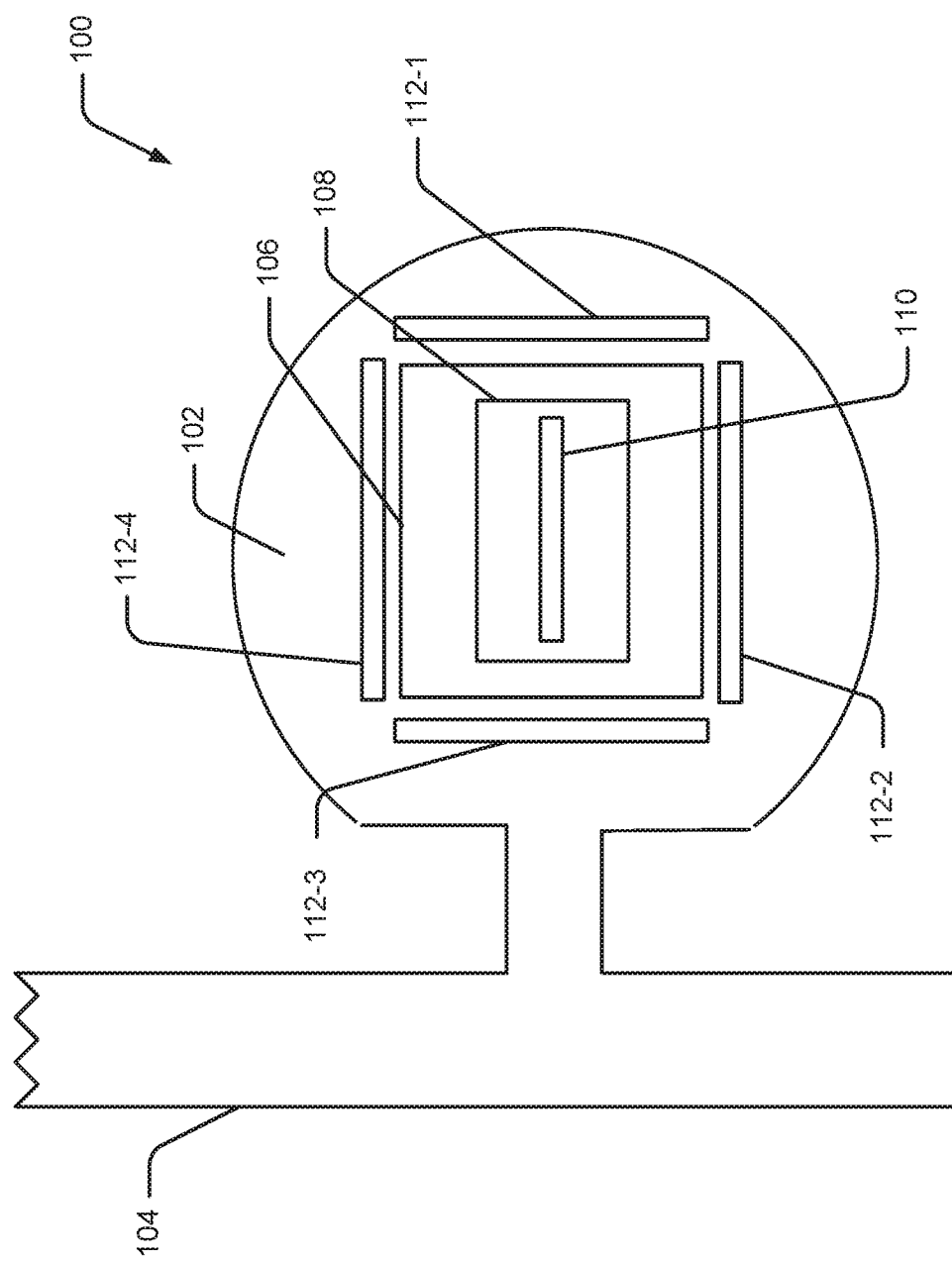
FIG. 1 illustrates a schematic view of a printhead-integrated ink level sensor system with a central clearing resistor in a slot of a sense capacitor plate, according to an example implementation of the present subject matter.

Printhead of an inkjet printer may draw ink from an ink supply assembly that supplies fluid ink to the printhead. The ink supply assembly may include a reservoir for storing ink. The printhead, the ink supply assembly, and the reservoir may be housed together in a replaceable device such as an integrated inkjet printhead cartridge.

An inkjet printhead cartridge may include one or more printheads, electrical contacts and an ink (or other fluid) supply chamber(s) to supply ink to the reservoir. The supply chamber may store one color of ink. Alternatively, a number of chambers may each store a different color of ink. The ink supply chambers may be removed, replaced, and/or refilled. Electrical contacts carry electrical signals to and from a controller, for example, to control fluid drop generators in the printheads to eject ink drops through nozzles and to make ink level measurements.

The controller may control the printheads for ejection of ink drops from nozzles, for example, by defining a pattern of ejected ink drops that form characters, symbols, and/or other graphics or images on the print media. The pattern of ejected ink drops may be determined by print job commands and/or command parameters from a data source. The controller may include a printer application specific integrated circuit (ASIC) to determine the level of ink in the printheads based on values from one or more printhead-integrated ink level sensors, PILS, integrated on the printhead die/substrate.

The level of ink available in the reservoir may be determined for a number of reasons, for example, to determine an appropriate time for replacement of the cartridge and to avoid premature replacement of the cartridge. The PILS comprises a sense capacitor whose capacitance varies based on the contents of a sensing chamber housing the sense capacitor. The sensing chamber is in fluid communication with the reservoir. The contents of the sense chamber may be all ink, ink and air, or just air. Thus, the value of the sense capacitor changes with the level of ink in the sense chamber of the PILS and provides an indication of the level of ink in the reservoir.

When the printhead is in an operational state (open and exposed to air) but not capped (or covered), it is said to be in a decap state or a decap period. During the decap period, water may evaporate from the ink within the sensing chamber resulting in various decap-induced issues such as pigment-ink-vehicle separation, latex-ink-vehicle separation, wax-ink-vehicle separation, weak bubble drive, viscous plug formation, and the like. Decap-induced issues lead to printer performance degradation as well as decreased sensitivity of the PILS causing erroneous ink-level detection. Decap time of a printhead is the time a nozzle of the printhead can remain dormant and/or uncapped and then still fire a drop without loss of velocity or misdirection. Thus, a higher decap time results in improved printer performance.

A plurality of peripheral clearing resistors surrounding the sense capacitor of the PILS may be provided to purge ink and/or ink residue from the sensing chamber prior to ink level measurements to mitigate decap-induced issues and to improve performance. However, the effectiveness of the peripheral clearing resistors in clearing decap-induced viscous plug (or soft plug) is limited, thereby limiting the sensitivity of the PILS.

The present subject matter describes printhead-integrated ink level sensor (PILS) systems and fluid ejection devices with a central clearing resistor. The PILS systems of the present subject matter mitigate decap-induced issues and increase sensitivity as well as the performance of the PILS systems and the fluid ejection devices.

In accordance with an example implementation of the present subject matter, the PILS system includes a sense capacitor plate in a fluid sensing chamber to sense a level of fluid in the fluid sensing chamber. The fluid sensing chamber is in fluid communication with a fluid reservoir of the printhead to receive fluid from the fluid reservoir. The sense capacitor plate includes at least one slot. The PILS system further includes at least one central clearing resistor and at least one peripheral clearing resistor to clear the fluid sensing chamber of the fluid. The central clearing resistor is provided in the at least one slot of the sense capacitor plate. The at least one peripheral resistor is provided in the fluid sensing chamber surrounding the sense capacitor plate.

The slot in the sense capacitor plate may extend from one end of the sense capacitor plate to another end of the sense capacitor plate forming an end-to-end slot. The end-to-end slot divides the sense capacitor plate into at least two sense capacitor plate patches. The at least two sense capacitor plate patches are electrically connected to each other.

In accordance with an example implementation of the present subject matter, the PILS system may be implemented in a fluid ejection device. The fluid ejection device includes a fluid reservoir formed on a printhead die and a fluid sensing chamber in fluid communication with the fluid reservoir. The fluid ejection device further comprises a metallic plate in the fluid sensing chamber. The metallic plate includes at least one slot. The fluid ejection device further comprises a plurality of clearing resistors, with at least one of the plurality of clearing resistors in the at least one slot of the metallic plate. The plurality of clearing resistors is to clear the fluid sensing chamber of the fluid. The metallic plate can form a part of a sense capacitor circuit to sense a level of the fluid in the fluid sensing chamber. At least one of the plurality of clearing resistors may be a peripheral clearing resistor provided surrounding the metallic plate in the fluid sensing chamber.

With the PILS systems and the fluid ejection devices of the present subject matter, the fluid may be effectively cleared from the fluid sensing chamber. Further, the central clearing resistor(s) in conjunction with the peripheral clearing resistor(s) help in uniformly heating the fluid sensing chamber, thereby enhancing the efficiency of clearing of the fluid from the fluid sensing chamber which results in improved performance of the PILS system. The use of central clearing resistors and the peripheral clearing resistors also increases the decap time of the printhead resulting in improved printer performance. Further, the slot in the sense capacitor plate increases the perimeter of the sense capacitor plate in comparison with a capacitor plate of the same dimensions without a slot. The increase in the perimeter of the sense capacitor plate results in an increase in the fringe capacitance, and hence the overall capacitance of the sense capacitance resulting in increased sensitivity in sensing the level of the fluid. Thus, with the PILS systems and the fluid ejection devices of the present subject matter, the sensitivity and the performance of the printhead are improved.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Example implementations of the present subject matter are described using a drop-on-demand thermal inkjet printing system with a thermal inkjet (TIJ) printhead as a fluid ejection device suitable for implementing a fluid level sensor or PILS. Other printhead types such as a piezoelectric printhead can also implement PILS systems and fluid ejections devices of the present subject matter.

FIG. 1 illustrates a schematic view of a PILS system 100, according to an example implementation of the present subject matter. An inkjet printhead may include more than one PILS system 100, although only one is shown in FIG. 1 for ease of illustration. The PILS systems may be implemented on a printhead die/substrate. The PILS system 100 includes a fluid sensing chamber 102 in fluid communication with a fluid reservoir 104 of the printhead to receive fluid from the fluid reservoir 104. The fluid sensing chamber 102 has a sense capacitor plate 106 for sensing a level of the fluid in the fluid sensing chamber. The sense capacitor plate 106 has a slot 108. The sense capacitor plate and the slot may be implemented in various ways. The slot 108 is shown as a rectangular slot in the center of the sense capacitor plate 106 in FIG. 1. The sense capacitor plate and the slot may be implemented in any shape and/or dimensions based on the printhead requirements and/or specifications. A central clearing resistor 110 is provided in the slot 108 of the sense capacitor plate 106. The PILS system also includes one or more peripheral clearing resistors surrounding the sense capacitor plate. In an example implementation, four such peripheral clearing resistors, 112-1, 112-2, 112-3, and 112-4, are provided. Each of the four peripheral clearing resistors is arranged adjacent and aligned parallel with a different side of the sense capacitor plate 106 as shown in FIG. 1. The peripheral clearing resistors, collectively referred to as peripheral clearing resistors 112, may be arranged in other ways. For example, the peripheral clearing resistors may be arranged in an in-line stacked manner on one side of the sense capacitor plate.

Figure 2:
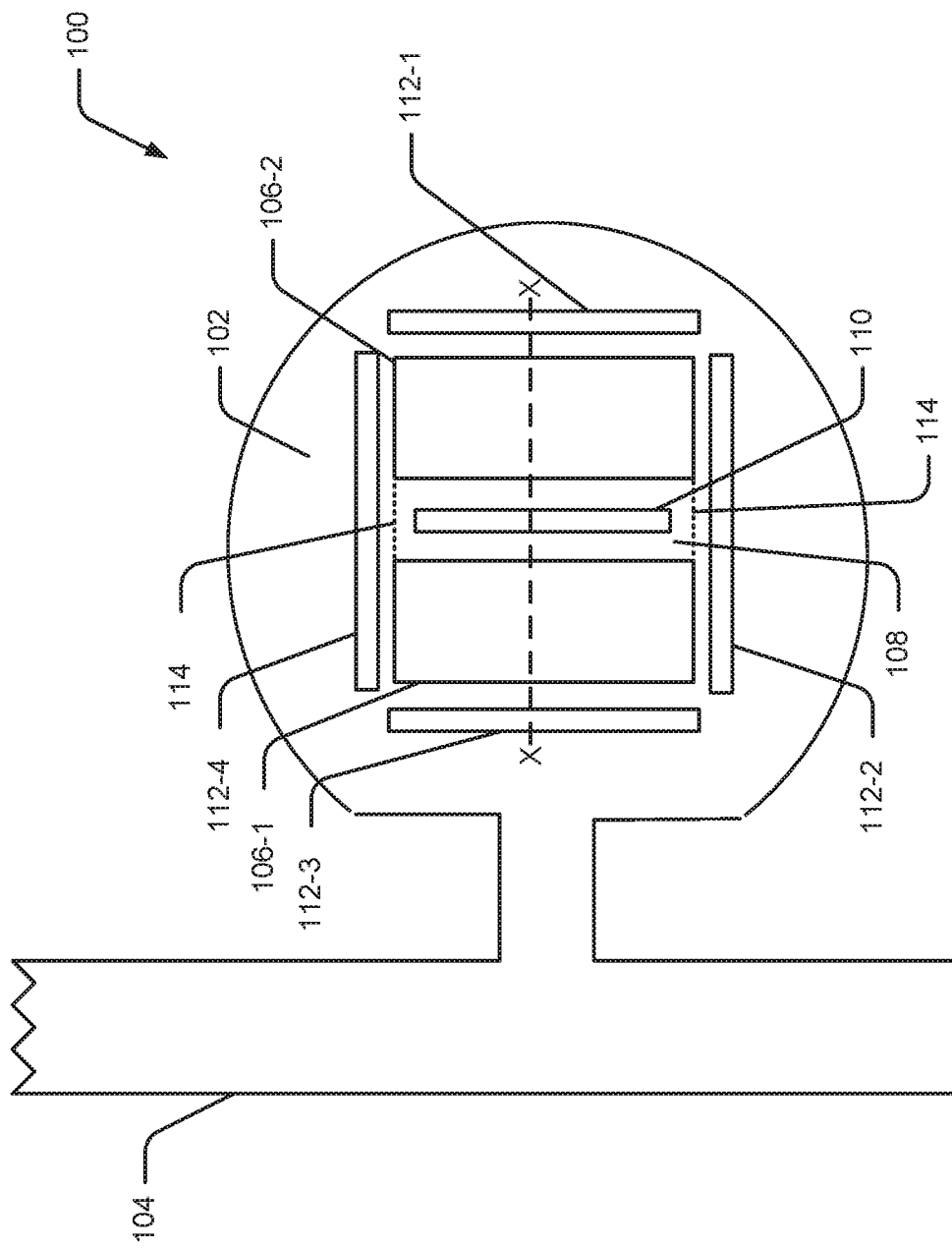
FIG. 2 illustrates a schematic view of a printhead-integrated ink level sensor system with a central clearing resistor in an end-to-end slot of a sense capacitor plate, according to an example implementation of the present subject matter.

In an example implementation, the slot 108 in the sense capacitor plate 106 is an end-to-end slot as illustrated in FIG. 2. The end-to-end slot divides the sense capacitor plate 106 in to two sense capacitor plate patches, 106-1 and 106-2 as shown in FIG. 2. The sense capacitor plate patches are electrically connected to each other as shown by the dashed line 114 in FIG. 2. More than one slot, including more than one end-to-end slot, may be provided in the sense capacitor plate 106. All the sense capacitor plate patches are electrically connected to each other. One or more central clearing resistors may be provided in each of the slots and/or between two adjacent sense capacitor plate patches.

Figure 3:
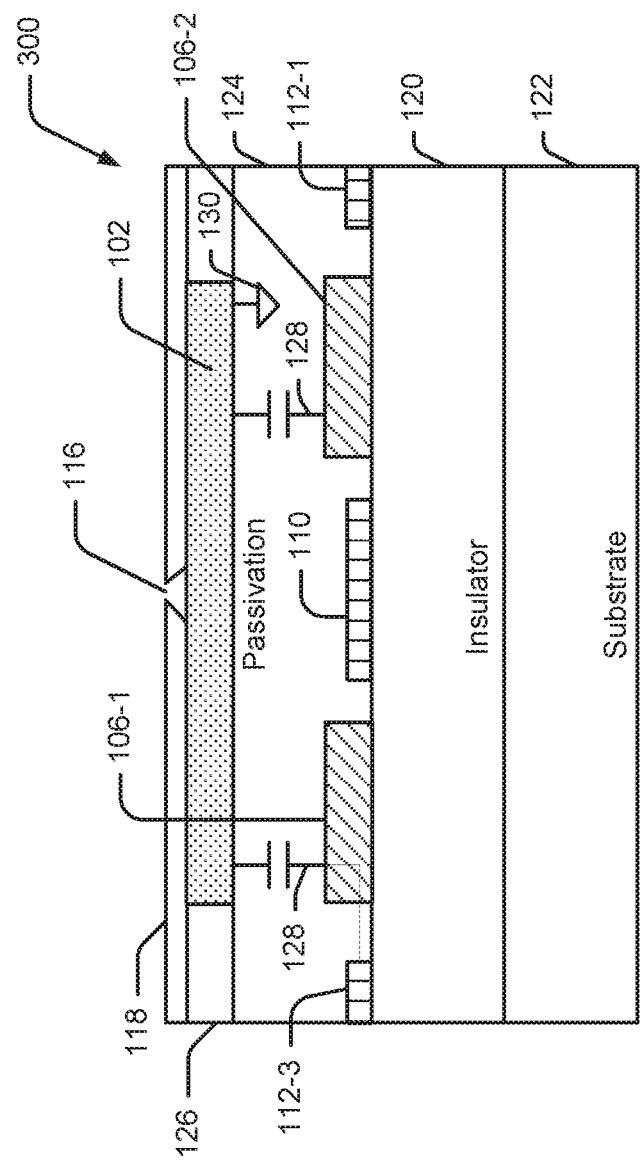
FIG. 3 illustrates a cross-sectional view of the printhead-integrated ink level sensor system along the line X-X of FIG. 2.

FIG. 3 shows a cross-sectional view of the PILS system along the X-X line shown in FIG. 2. The PILS system is shown in a fluid ejection device 300 including a nozzle 116, the fluid sensing chamber 102, and the sense capacitor plate patches 106-1 and 106-2 serving as firing elements. The nozzle 116 is formed in a nozzle layer 118. Printhead nozzles are generally arranged to form nozzle columns (not shown) along the sides of the fluid reservoir formed in a printhead die. The sense capacitor plate patches are formed of a metal plate (for example, tantalum-aluminum, TaAl) on an insulating layer 120 (for example, polysilicon glass, PSG) on a top surface of a silicon substrate 122. A passivation layer 124 is provided over the sense capacitor plate patches 106-1 and 106-2. The passivation layer 124 protects the sense capacitor plate patches 106-1 and 106-2 from the fluid in the fluid sensing chamber 102 and acts as a mechanical passivation or protective cavitation barrier structure to absorb the shock of collapsing vapor bubbles. The fluid sensing chamber 102 is formed in a chamber layer 126 that separates the substrate 122 from the nozzle layer 118. The central clearing resistor 110 is provided between the two sense capacitor plate patches 106-1 and 106-2. Additional peripheral clearing resistors 112-1 and 112-3 are provided on the periphery of the two sense capacitor plate patches 106-1 and 106-2, respectively. A common ground 130 is provided for the clearing resistors. A sense capacitor 128 is formed by the electrically connected sense capacitor plate patches 106-1 and 106-2, the passivation layer 124 and the substance (or contents) of the fluid sensing chamber 102. A measure of the value of the sense capacitance 128 is indicative of the level of fluid in the fluid sensing chamber 102 and thus, the level of fluid in the fluid reservoir 104.

The fluid ejection device 300 acts as a drop-on-demand printhead by ejecting fluid drops through the nozzle 116. A controller (not shown) causes electric current to pass through the sense capacitor plate 106 that acts as a firing element, thus rapidly heating the firing elements (i.e., the sense capacitor plate patches 106-1 and 106-2). A thin layer of fluid adjacent to the passivation layer 124 in the fluid sensing chamber 102 over the firing elements is superheated and vaporized, creating a vapor bubble in the fluid sensing chamber 102. The rapidly expanding vapor bubble forces a fluid drop out of the nozzle 116. When the firing elements cool, the vapor bubble quickly collapses, drawing more fluid from the fluid reservoir 104 into the fluid sensing chamber 102 in preparation for ejecting another drop from the nozzle 116.

During the decap period, when the nozzles of the printhead are exposed to air and are uncapped, water may evaporate from the ink within the sensing chamber resulting in various decap-induced issues. For example, a viscous plug may form in the fluid sensing chamber that may degrade the sensitivity of the PILS system.

Clearing resistors, including the central clearing resistor 110 and the peripheral clearing resistors are used to purge ink and/or ink residue from the fluid sensing chamber 102 prior to a fluid level sense operation to measure the ink level in the fluid reservoir by a sensor circuit of the controller. In an example implementation, the controller may programmably control the resistance value of the clearing resistors. The resistance value may be controlled based on, for example, the type of the ink used in the printhead or other printhead parameters such as nozzle size and the like. In an example implementation, the value of the clearing resistors may be adjusted to be that of a firing resistor in a High Drop Weight (HDW) nozzle. The value of the clearing resistors may be the same or different. The clearing resistors as well as the sense capacitor plate comprise thermal resistors, formed of a metal plate, for example, TaAl, to provide rapid heating of the ink and/or ink residue and to force the fluid out of the fluid sensing chamber 102. Fluid flowing back into the fluid sensing chamber 102 from the fluid reservoir 104 then enables a more accurate sense of the ink level through the sense capacitor 128.

In an example implementation, one or more circulation passages (not shown) may be provided in the fluid ejection device 300 along which fluid flows or circulates. The circulation passages extend from the fluid reservoir into the fluid sensing chamber across the sense capacitor plate and back into the fluid reservoir. Further, a fluid pump may be provided in the circulation passage so as to pump and circulate fluid through the circulation passage. In an example implementation, the fluid pump may be located within the circulation passage. The fluid pump may be a thermal resistor, similar to the clearing resistors described earlier. In another example implementation, the fluid pump may comprise other micro pumping devices, such as piezoelectric device, wherein a diaphragm is deflected to forcefully eject or pump fluid from the circulation passage.

Figure 4:
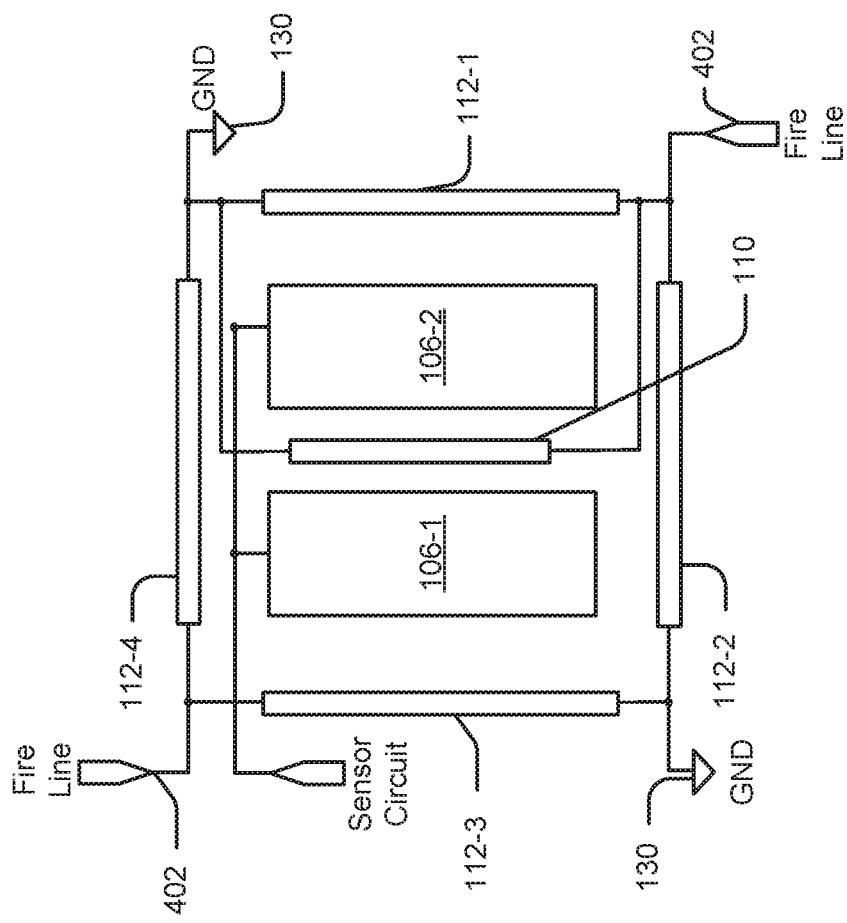
FIG. 4 illustrates electrical connections in the printhead-integrated ink level sensor system, according to an example implementation of the present subject matter.

FIG. 4 illustrates electrical connections in the PILS system, according to an example implementation of the present subject matter. The sense capacitor plate patches 106-1 and 106-2 are electrically connected to the sensor circuit of the controller (not shown). The central clearing resistor 110 and the peripheral clearing resistors 112 are connected to a fire line 402 controlled by the controller to purge fluid from the fluid sensing chamber prior to a fluid level measurement. The clearing resistors are connected to a common ground 130.

The central clearing resistor 110 along with additional peripheral clearing resistors 112 provides for a significant clearing of the fluid from the fluid sensing chamber by uniformly heating the fluid sensing chamber. Due to the improved clearing of the fluid sensing chamber, the decap time of the printhead is increased. For example, in one example implementation, the decap time of the printhead is about 45 seconds in a printhead with a clearing resistor provided in an end-to-end slot of the sense capacitor plate and having four peripheral resistors, each arranged adjacent and aligned parallel with a different side of the sense capacitor plate as shown in FIG. 2. The decap time increased by about two times when compared to a printhead without a slot in the sense capacitor plate and no central clearing resistor. Additionally, the reduced area of the sense capacitor plate due to the provision of a slot in the sense capacitor plate does not significantly affect sensor accuracy when compared to a sense capacitor plate without a slot. Wet sensor readings of an example implementation of a sense capacitor plate with and without a slot showed similar performance. The improved clearing due the central clearing resistor as well as increased perimeter of the sense capacitor plate (due to the slot) increases the overall sense capacitance and hence, improves the sensor accuracy.

Although implementations for PILS systems and fluid ejection devices have been described in language specific to structural features, it is to be understood that the present subject matter is not limited to the specific features described. Rather, the specific features are disclosed and explained as example implementations for PILS systems and fluid ejection devices.

We claim:

1. A printhead-integrated ink level sensor (PILS) system comprising:
   a fluid sensing chamber in fluid communication with a fluid reservoir to receive fluid from the fluid reservoir;
   a sense capacitor plate to sense a level of fluid in the fluid sensing chamber, the sense capacitor plate having at least one slot;
   a central clearing resistor in the at least one slot of the se a capacitor plate; and
   at least one peripheral clearing resistor surrounding the sense capacitor plate in the fluid sensing chamber;
   wherein the at least one central clearing resistor and the at least one peripheral resistor are to clear the fluid sensing chamber of the fluid.

2. The PILS system as claimed in claim 1, wherein the at least one slot extends from one end of the sense capacitor plate to another end of the sense capacitor plate forming an end-to-end slot dividing the sense capacitor plate into at least two sense capacitor plate patches, and wherein the at least two sense capacitor plate patches are electrically connected to each other.

3. The PILS systems as claimed in claim 1, wherein the at least one peripheral clearing resistor includes four peripheral clearing resistors, each of the four peripheral clearing resistors arranged adjacent to and aligned parallel with a different side of the sense capacitor plate.

4. The PILS system as claimed in claim 1, further comprising a controller, and wherein the sense capacitor plate is electrically connected to a sensor circuit of a controller to sense the level of the fluid in the fluid sensing chamber.

5. The PILS system as claimed in claim 4, wherein the at least one central clearing resistor and the at least one peripheral clearing resistor are connected to a fire line controlled by the controller to clear fluid from the fluid sensing chamber prior to a fluid level sense operation.

6. The PILS system as claimed in claim 4, wherein the controller controls a value of the resistance of the at least one central clearing resistor and the at least one peripheral clearing resistor.

7. The PILS system as claimed in claim 6, wherein the value, of the resistance of the at least one central clearing resistor and the at least one peripheral clearing resistor are the same.

8. The PILS system as claimed in claim 6, wherein the value of the resistance of the at least one central clearing resistor and the at least one peripheral clearing resistor are different.

9. The PILS system as claimed in claim 1, wherein the sense capacitor plate, the at least one central clearing resistor and the at least one peripheral clearing resistor are thermal resistors formed of a metal plate.

10. The PILS system as claimed in claim 9, wherein the metal plate a Tantalum-Aluminum plate.

11. A fluid ejection device comprising:
a fluid reservoir formed in a printhead die;
a fluid sensing chamber in fluid communication with the fluid reservoir;
a printhead-integrated ink level sensor (PILS) comprising a metallic plate to sense a level of fluid in the fluid sensing chamber, the metallic plate having at least one slot; and
a plurality of clearing resistors to clear the fluid sensing chamber of the fluid;
wherein at least one of the plurality of clearing resistors is in the at least one slot of the metallic plate and at least of the plurality of clearing resistors is a peripheral clearing resistor surrounding the metallic plate in the fluid sensing chamber.

12. The fluid ejection device as claimed in claim 11, further comprising a circulation passage to circulate fluid from the fluid reservoir to the fluid sensing chamber and back into the fluid reservoir.

13. The fluid ejection device as claimed in claim 12, further comprising a fluid pump in the circulation passage to pump fluid in the circulation passage.

14. The fluid ejection device as claimed in claim 13, wherein the fluid pump comprises a thermal resistor.

15. The fluid ejection device as claimed in claim 11, wherein the fluid ejection device is a thermal inkjet printhead.

* * * * *